Figure 1:
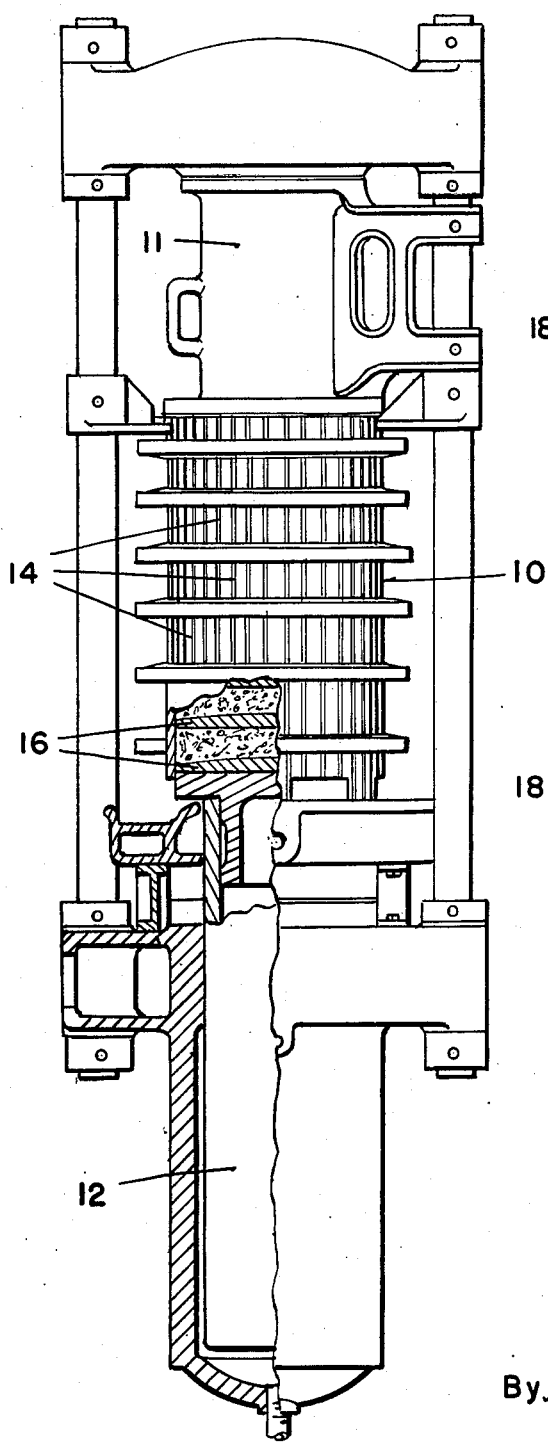

Dec. 9, 1952        H. J. HARRISON        2,620,725

PRESSURE PLATE FOR PLURAL PLATEN PRESSES

Filed July 22, 1949

Inventor:
Henry J. Harrison,
By Henry H. Snelling
Attorney

UNITED STATES PATENT OFFICE 2,620,725

PRESSURE PLATE FOR PLURAL PLATEN PRESSES

Henry J. Harrison, El Paso, Tex.

Application July 22, 1949, Serial No. 106,308

1 Claim. (Cl. 100—198)

This invention relates to the extraction of grease from meat scraps and has for its principal object a method of increasing the amount of grease extracted and a particular type of plate which can be used with existing presses.

Figure 2:
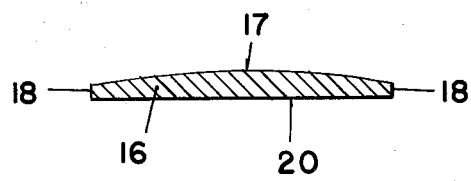
Figure 3:
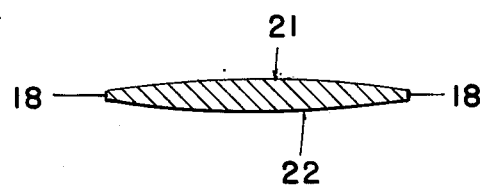

In the drawings:

Figure 1 is a central section thru a press.
Figure 2 is a central section thru a plate.
Figure 3 is a modification.

In the extraction of grease from meat scraps it is common practice to exert a pressure in the neighborhood of 4,000 pounds on the scraps in a press such as illustrated and described in Allbright, Patent No. 1,898,116. This press is quite satisfactory but by modifying the pressure plates, which invariably have two flat major surfaces, it is possible to increase the yield of the grease by about one-fifth. Any increase in the amount of grease extracted is of material benefit since the grease has more value than the meat scraps and paradoxically the meat scraps become more valuable with less grease because of the increase in the protein value of the scraps.

The press cylinder 10 has a head 11 and a movable piston 12 as well illustrated in the patent. The cylinder 10 has a great number of narrow vertical openings 14 thru which the grease passes as pressure is applied to the movable piston or ram 12.

The improvement consists in substituting for the usual plate with its two flat sides a plate such as 16 having at least one face 17 of convex shape preferably being a portion of a sphere of a diameter which forms a plate one and a half times as thick at its center as at the circular periphery 18. The diameter of the plate is approximately two feet (2'), the edge being approximately one quarter of an inch (¼") in thickness and the plate at its central axis parallel to the edge being approximately three eighths of an inch (⅜") in thickness. The side face 18 is circular so as to fit readily within the cylinder. If desired instead of the flat face 20 in the preferred form, I may substitute two curved convex surfaces, these surfaces may follow any curve formed by a surface of revolution, for example, the upper surface 21 may be the surface of an ellipsoid and the other face 22 could be a cone with its cusp or point rounded off. In these different modifications the prime thought in each case is that the thickness of the circular plate at its center is greater than its thickness at or near the periphery and the curve should be such that when the plate is in place in the press and power is applied, the central portion of each cake between adjacent plates 16 will first be pressed that is the grease is forced from the center of each cake toward the edges in constantly increasing ratio so that when the piston or ram movement is completed, the meat scraps will come out in cake form, one cake between each two adjacent plates 16 and this pressed plate will, of course, have a single concave face with a depth of about one-eighth of an inch in the center if the preferred plate is used, or the cake will be double concave if the plate has two convex surfaces.

What I claim is:

In a plural platen press adapted to be used for the extraction of grease from meat scraps wherein a series of spaced and similar pressure plates are positioned in superposed relation with the meat scrap between adjacent pressure plates: each pressure plate consisting of a disk having a plane face, a cylindrical edge, and a convex face, the diameter of the plate being approximately 2', the edge of the plate approximately ¼" in thickness and the plate at its central axis parallel to the edge being approximately ⅜" in thickness, said plate having its convex surface the curved portion of a segment of a sphere, the height of the segment being approximately ⅛" and the diameter of the base of the segment being the diameter of the plate.

HENRY J. HARRISON.

REFERENCES CITED

The following references are of record in the file of this patent:

UNITED STATES PATENTS

| Number | Name | Date |
|---|---|---|
| 1,206,656 | Benedictus | Nov. 28, 1916 |
| 1,898,116 | Allbright | Feb. 21, 1933 |

FOREIGN PATENTS

| Number | Country | Date |
|---|---|---|
| 17,737 | Denmark | of 1913 |
| 554,864 | France | of 1923 |